Patented Apr. 1, 1952

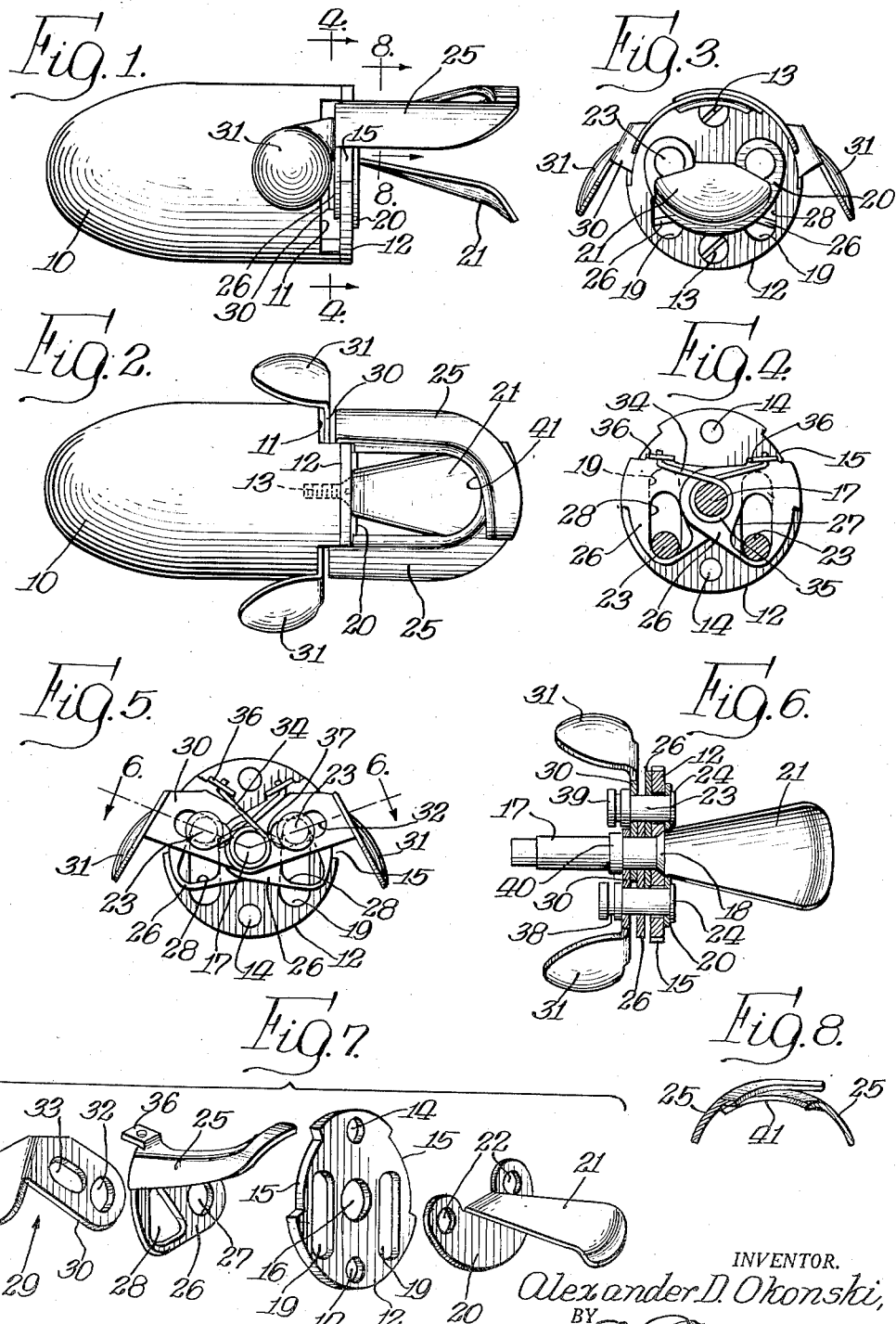

2,591,092

UNITED STATES PATENT OFFICE 2,591,092

FINGERNAIL GUARD

Alexander D. Okonski, Chicago, Ill.

Application March 14, 1950, Serial No. 149,570

5 Claims. (Cl. 2—21)

The present invention relates to finger nail guards, and has for its main object the provision of a pair of coacting guard members and a finger support disposed therebelow, with a suitable mechanism whereby said finger support may be shifted away from said guard members in order that the end of a finger may be received therebetween, said mechanism when further actuated being capable of shifting said guard members away from each other for accommodating therebetween finger nails of varying widths.

Another object of the present invention is the provision of a finger nail guard wherein the guard members may be adjustable to accommodate finger nails of varying widths.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

Fig. 1 is a side elevational view of the present device;

Fig. 2 is a top elevational view thereof;

Fig. 3 is an end elevational view thereof;

Fig. 4 is a view, partly in section, and partly in elevation, with the members for operating finger supporting member and guard members removed, the view being rearwardly of that of Fig. 3, and taken substantially on line 4—4 of Fig. 1;

Fig. 5 is a similar view with the actuating members for operating finger supporting member and guard members in an inoperative position;

Fig. 6 is a view taken substantially on line 6—6 of Fig. 5;

Fig. 7 is the perspective, exploded view of the principal parts of the present device; and Fig. 8 is a cross-sectional view on line 8—8 of Fig. 1.

Referring in detail to the present drawing there is shown an oblong cylindrical casing 10, which may preferably be hollow, and if desired may be made in the shape of a bullet, as shown in the drawing. Adjacent its open end, and along its rim said casing 10 is provided with a pair of opposed recesses 11. Fitted over said open end of casing 10 is supporting plate 12, which by means of a pair of screws 13, passing through apertures 14, is affixed to the said end of casing 10.

Adjacent its periphery said plate 12 is provided with a pair of opposed recesses 15, both of which are at the upper half of said plate 12, and are disposed opposite to said recesses 11 made in said casing 10, said recesses 15 being however shorter than said recesses 11, as is seen in Fig. 1.

Made in the center of said plate 12 is opening 16 within which one end of shaft 17 is receivable, one end of said shaft 17 being riveted in said opening 16, as at 18, and remains flush with the front face of said plate 12. Said plate 12 is further provided with a pair of oblong slots 19, between which said opening 16 and said shaft 17 are located.

Superimposed upon the front face of said supporting plate 12 is crescent-shaped plate 20, from the upper edge of which and centrally thereof finger supporting member 21 at right angle projects. Said crescent-shaped plate 20 at its upper ends is provided with openings 22 for receiving therewithin the ends of pins 23, which are riveted as at 24.

Co-acting with said supporting plate is a pair of nail guard members 25, each of substantially L-shaped form, with the free ends thereof turned towards each other in an overlapping relation, as is clearly seen in Figs. 2 and 8. Each of said finger nail members 25 is integrally formed with base plate 26, from which each of said members 25 projects substantially at a right angle. Each of said base plates 26 is substantially of a triangular formation, from one corner of which each of said finger nail members 25 projects, as is clearly seen in Figs. 4 and 7. Adjacent another corner of each of said base plates 26 opening 27 is provided, through which said shaft 17 is passed. In the operative position of the device said base plates 26 are in a mutually superimposed, overlapping position, as is best seen in Figs. 4 and 6. Adjacent the remaining corner each base plate 26 is provided with a substantially triangular slot 28, through which said pins 23 are passed.

A pair of members, generally indicated by 29 in Fig. 7, for shifting said finger supporting member 21 away from said nail guard members 25, and in succession for shifting said nail guard members 25 away from each other for accommodating various widths of nails therebetween, is provided, and each includes an oblong plate 30. Extending from each plate 30, in a substantially perpendicular relation is knob member 31. Each of said plates 30, adjacent its free end has opening 32, through which shaft 17 extends. Intermediately of said opening 32 and knob member 31 each plate 30 is provided with an oblong slot 33, through each of which one pin 23 extends. In the operative association of said actuating members 29, plates 30 thereof extend through and are positioned within recesses 11 made in casing 10. Said knob members 31 are directed toward the opposite end of said casing 10, and away from members 21 and 25.

Tensioning wire spring 34 is provided with loop 35 at its center, which loop 35 is encompassed around shaft 17. The free ends of said spring 34 engage lugs 36 integrally formed with base plates 26 and projecting in the direction away from said nail guard members 25, as is clearly seen in Figs. 4, 5 and 7. Normally the ends of said spring 34 tend to flex towards each other for exerting pressure upon both lugs 36 for the purpose of shifting said lugs towards each other, and with them for shifting nail guard members 25 towards each other, as is best shown in Figs. 2 and 5. In that inoperative position of nail guard members 25 the latter, by their inner edges, adjacent their bases contact the body portions of supporting plate 12 adjacent the upper ends of said recesses 15, as is seen in Fig. 5.

Another wire spring 37 is looped around shaft 17, by its central portion, with each of its ends engaged within groove 38 made in the inner head 39 of each pin 23. Said spring 37 normally tends to flex by its ends engaged at pins 23 into an upward direction, for normally maintaining said pins 23 in contact with the body portions of said supporting plate 12 adjacent the upper ends of slots 19. By virtue of this action of spring 37 the operating members 29 are maintained in a raised inoperative position, best shown in Fig. 5.

From the hereinabove description it will be seen that shaft 17, passing through openings 27 and 32 forms a pivot for base plates 26 and plates 30. Said shaft 17 is provided with collar 40 which remains in contact with the adjacent plate 30, and said collar 40, in cooperation with rivet 18, maintains a pair of plates 26 and a pair of plates 30 in a stacked relation upon the inner face of supporting plate 12. Each pin 23, in a rigid association with crescent-shaped plate 20, is passed through slots 19, 28 and 33. Rivets 24 and heads 39 made at the ends of each pin 23 tend to maintain plates 26 and 30 in a stacked relation, at points removed from openings 27 and 32, but permitting shifting movement of said latter plates upon shaft 17.

Due to the action of springs 34 and 37 the several parts of the mechanism of the device are maintained in their inoperative position, best shown in Fig. 5 and hereinabove described.

When knob members 31 are pressed towards each other and in a downward direction plates 30 are caused to shift downwardly and angularly upon their pivot which is shaft 17. This shifting movement causes pins 23 to shift into a downward direction within slots 19, due to the connection between said plates 30 and said pins 23 by virtue of the latter being within slots 33. The downward shifting movement of said pins 23 within slots 19 forces the downward shifting movement of crescent-shaped plate 20 for bringing finger supporting member 21 away from nail guard members 25.

The downward shifting movement of said plates 30 is of course against the tension of spring 37 by virtue of the connection thereof by its ends with pins 23. The oblong slots 33 permit the accommodation of said pins 23 with relation to plates 30 by virtue of the change of distance between pivot 17 and pins 23 as said plates 30 downwardly shift.

It is noted that the bases of the triangular slots 28 terminate short of the lower ends of slots 19, as is seen in Fig. 5. Therefore, the downward shifting movement of plates 30 on pressing knob members 31 does not immediately affect base plates 26 or their nail guard members 25. It is only when pins 23 have been brought in contact with the body portions of base plates 26 adjacent the lower ends of said slots 28, and when said knob members 31 are continued to be further pressed, that pins 23 bear against said base plates 26 in order to angularly shift them upon their pivot 17 for shifting nail guard members 25 away from each other. This latter operation causes the bases of said nail guard members 25 to ride downwardly within recesses 15 to bring said bases to their utmost shifted position in contact with the body portions of said supporting plate 12 at the lower ends of said recesses 15, the operative position thereof best shown in Fig. 4. In that latter position pins 23 remain in contact with the body portions of said supporting plate 12 adjacent the lower ends of slots 19. In that position of pins 23 crescent-shaped plate 20 will remain shifted to the farthest distance from nail guard members 25, with the latter members spread away from each other to the maximum distance. It is observed that slots 28 being widest at their lower ends permit full play of pins 23 upon base plates 26 for bringing about the operative spread position of said nail guard members 25.

When said finger supporting member 21 has been brought to its maximum shifted position away from nail guard members 25, with the latter shifted to the maximum away from each other, a finger is then inserted between said members 21 and 25, with the nail thereof disposed toward said nail guard members 25. Thereupon the pressure upon knob members 31 is released permitting springs 34 and 37 to flex normally. This condition causes first said nail guard members 25 to shift towards each other until the sharp inner edges of said members 25 biting into the cuticle laterally of the nail, or into the sides of the nail, are prevented from further shifting towards each other. Second, immediately thereafter member 21, due to the action of spring 37 causes to shift upwardly for exerting pressure upon the lower side of the finger for pressing the latter against nail guard members 25 for maintaining the latter in an operative contact with nail guard members 25, in order that manicuring operation, such as applying paint to the nail may be accomplished, without permitting paint to spatter upon the body of the finger adjacent the nail thereof.

From the hereinabove description it will be also seen that by virtue of the relation of slots 19 and 28 the action of operating members 29, when knobs 31 are pressed, upon member 21 and nail guard members 25 takes place in succession.

It is further noted that the inner edges of said nail guard members 25, adjacent their free ends are comparatively sharp, as at 41 for causing the same to bite under the cuticle at the base of the nail in order to detach the cuticle from the nail when the device is being inserted upon the end of the finger.

While there is described herein a preferred embodiment of the present invention, it is nevertheless to be understood that minor changes may be made therein without departing from the spirit and scope of the invention as claimed.

What I claim as new is:

1. A finger nail guard comprising a supporting plate, a pivot carried by said supporting plate, a plate in contact with one face of said supporting plate, a finger supporting member carried by said plate, a pair of base plates superimposed upon the opposite face of said supporting plate, a pair of nail guard members, one extending from each of said base plates, said finger supporting member and said nail guard members being substantially in a perpendicular relation with said supporting plate and extending away from said first named face thereof, said base plates being set upon said pivot, a pair of pins in engagement with said plate, said supporting plate being provided with oblong slots through which said pins extend, tensioning means coacting with said pivot and said pins for maintaining said finger supporting member in its inoperative position and in a proximity of said nail guard members, tensioning means coacting with said pivot and said base plates for maintaining said nail guard members in their inoperative position shifted towards each other, said base plates being provided with slots through which said pins are passed, and means for inducing shifting of said pins within said first named slots against the action of said first named tensioning means for shifting said finger supporting member away from said nail guard members, the shifting of said pins within said second named slots being against the body portions of said base plates adjacent their slots against the action of said second named tensioning means for shifting said nail guard members away from each other.

2. A finger nail guard comprising a supporting plate, a nail guard member carried by said supporting plate, a finger supporting member in a spaced relation with said nail guard member, a pivot carried by said supporting plate, a pair of pins in a rigid association with said finger supporting member by one of their ends, said supporting plate being provided with a pair of oblong slots through which said pins are extended, tensioning means coacting with said pivot and said pins for normally maintaining said finger supporting member in proximity to said nail guard member, and means associated with the opposite ends of said pins for inducing shifting of said pins in said slots against the action of said tensioning means for shifting said finger supporting member away from said nail guard member for providing a space therebetween for reception of a finger.

3. A finger nail guard comprising a supporting plate, a nail guard member carried by said supporting plate, a finger supporting member in a spaced relation with said nail guard member, a pivot carried by said supporting plate, a pair of pins in a rigid association with said finger supporting member by one of their ends, said supporting plate being provided with a pair of oblong slots through which said pins are extended, tensioning means coacting with said pivot and said pins for normally maintaining said finger supporting member in proximity to said nail guard member, and a pair of actuating members set upon said pivot, each of said actuating members being in engagement with the opposite end of each of said pins, manual pressure applied to said actuating members causing said pins to shift within said slots against the action of said tensioning means for shifting said finger supporting member away from said nail guard member for providing a sufficient space therebetween for reception of a finger, on release of the manual pressure from said actuating members said tensioning means shifting said finger supporting member toward said nail guard member for clamping a finger therebetween.

4. A finger nail guard comprising a supporting plate, a pair of base plates in a contactual relation with said supporting plate, a nail guard member extending from each of said base plates, a pivot carried by said supporting plate, said base plates being set upon said pivot for a rotary shifting movement thereabout, tensioning means in association with said pivot and said base plates for normally maintaining said nail guard members in a mutually shifted position towards each other, means for inducing a rotary shifting of said base plates around said pivot against the action of said tensioning means for shifting said nail guard members away from each other for accommodating therebetween various widths of finger nails, and a finger supporting member disposed below said nail guard members.

5. A finger nail guard comprising a supporting plate, a pair of base plates in a contactual relation with said supporting plate, a nail guard member extending from each of said base plates, a pivot carried by said supporting plate, said base plates being set upon said pivot for a rotary shifting movement thereabout, tensioning means in association with said pivot and said base plates for normally maintaining said nail guard members in a mutually shifted position towards each other, a pair of actuating members set upon said pivot and in engagement with said base plates, manual pressure applied to said actuating members inducing a rotary shifting movement of said base plates around said pivot against the action of said tensioning means for shifting said nail guard members away from each other for accommodating therebetween various widths of finger nails, and a finger supporting member disposed below said nail guard members.

ALEXANDER D. OKONSKI.

REFERENCES CITED

The following references are of record in the file of this patent:

UNITED STATES PATENTS

| Number | Name | Date |
| --- | --- | --- |
| 2,179,046 | Lewis | Nov. 7, 1939 |
| 2,337,244 | Iborra | Dec. 21, 1943 |